Sept. 5, 1961

H. J. HIBSHMAN 2,999,057

HOMOGENEOUS NUCLEAR REACTORS

Filed July 3, 1956

Henry J. Hibshman  Inventor

By  Attorney

Sept. 5, 1961     H. J. HIBSHMAN     2,999,057
HOMOGENEOUS NUCLEAR REACTORS
Filed July 3, 1956     4 Sheets-Sheet 2

Henry J. Hibshman     Inventor

By E. J. Brenner     Attorney

United States Patent Office 2,999,057
Patented Sept. 5, 1961

2,999,057
HOMOGENEOUS NUCLEAR REACTORS
Henry J. Hibshman, Plainfield, N.J., assignor to Esso Research and Engineering Company, a corporation of Delaware
Filed July 3, 1956, Ser. No. 596,133
10 Claims. (Cl. 204—154.2)

This invention relates to nuclear reactions and more particularly relates to an improved method and apparatus for carrying out nuclear reactions. Still more particularly, the invention relates to improved homogeneous nuclear reactors and to their methods of operation.

The importance and uses of nuclear reactors or atomic piles are well known. These nuclear reactors are designed to induce fission and to maintain and control chain reactions. The reactors can be designed to produce power, supply neutrons, produce radioactive isotopes, initiate nuclear reactions, produce plutonium from U-238, and initiate and promote chemical reactions. All of these reactors rely on the same principles of operation . . . the possibility of fission and a self-sustaining chain reaction.

Nuclear reactors may be classified as heterogeneous or homogeneous reactors. In a heterogeneous reactor, the fuel is in distinct shapes, usually in solid form such as rods, slugs or plates. Generally, it is either placed in the moderator in channels in a lattice-like arrangement or sustained as rods in a liquid moderator if the moderator is in that form. In a homogeneous reactor, the fissionable material or fuel is intermixed usually in a solution with the moderator and distributed uniformly throughout the core of the reactor. The majority of the nuclear reactors which have been built to date are of the heterogeneous type. However, the homogeneous nuclear reactor has a number of important advantages over the heterogeneous type of reactor. The most important advantage of the homogeneous reactor is that fuel fabrication and processing are enormously simplified. The fuel solution is pumped continuously through the reactor chamber and then cooled in outside heat exchangers. Some of the fuel can be continually bled off for purification and then reintroduced into the circulating stream of combined fuel and moderator. One of the interesting features of the homogeneous reactor is that it can be self-regulating. As the temperature of the reactor rises, its reactivity (nuclear reaction) decreases and therefore it controls itself.

The homogeneous nuclear reactors proposed heretofore have a number of limitations. More particularly, the radiation flux produced in these homogeneous nuclear reactors (as well as heterogeneous reactors) has been lower than would be desired. Generally, the intensity of flux has been limited by the means available for removing the heat of nuclear reaction. Higher fluxes can be obtained in these homogeneous nuclear reactors by more rapidly moving the liquid homogeneous fuel mixture into the reactor core through the inlet line and out of the reactor core by the outlet line. However, the rate of movement of the liquid homogeneous fuel through the inlet line into the core and then from the core through the outlet line is limited by the pressure drops through the inlet line and outlet line. The size of the inlet line and the outlet line can be increased to alleviate this problem to a certain extent. However, it will be appreciated that as the size of the inlet line and outlet line to the reactor core increase relative to the volume of the reactor core, the entire nuclear reactor approaches the configuration of a single uniform sized pipe. When this point is reached, the normal operation of the homogeneous nuclear reactor breaks down since a continuous chain reaction would be present everywhere in the reactor circuit. For these reasons, it has not been possible heretofore to make very high flux homogeneous nuclear reactors, i.e., having a neutron flux above about $3 \times 10^{13}$ neutrons/cm.$^2$/sec. Because of the importance of this new field, there is a continuing need for new and improved reactor designs. The aforementioned limitations of the prior art homogeneous nuclear reactors are overcome by the present invention.

A novel method and apparatus have now been found for carrying out nuclear reactions in a homogeneous type of nuclear reactor. In accordance with the present invention, heat is removed from high flux homogeneous nuclear reactors faster than has been possible heretofore. More particularly, the improved nuclear reactor of the present invention comprises a reactor core, means for feeding a plurality of individual streams of homogeneous liquid nuclear fuel to this core and means for withdrawing a plurality of individual streams of homogeneous liquid nuclear fuel from the core. The present nuclear reactor is also provided with heat exchange means for cooling the individual streams of homogeneous liquid nuclear fuel withdrawn from the reactor core. Thus, the present improved method for effecting a controlled nuclear reaction comprises feeding a plurality of individual streams of homogeneous liquid nuclear fuel to a zone of critical mass and withdrawing from this zone of critical mass a plurality of individual streams of homogeneous liquid nuclear fuel. In the present method, the streams of homogeneous nuclear fuel which are withdrawn from the critical mass zone are cooled and are then recycled to the critical mass zone in a continuous operation. The present invention is applicable to nuclear reactions carried out wherein the neutrons are utilized at low, intermediate or high energies to provide respectively thermal, intermediate and fast reactors. The nuclear reactors of the present invention have a number of desirable advantages, including (1) extremely effective cooling and (2) extraordinarily high radiation fluxes. The present novel high flux reactors are particularly useful for supplying neutrons, producing power and radioactive isotopes, for materials testing and for effecting chemical reactions such as hydrocarbon conversions.

The instant invention will be more readily understood by reference to the attached drawings of which:

Figure 1:
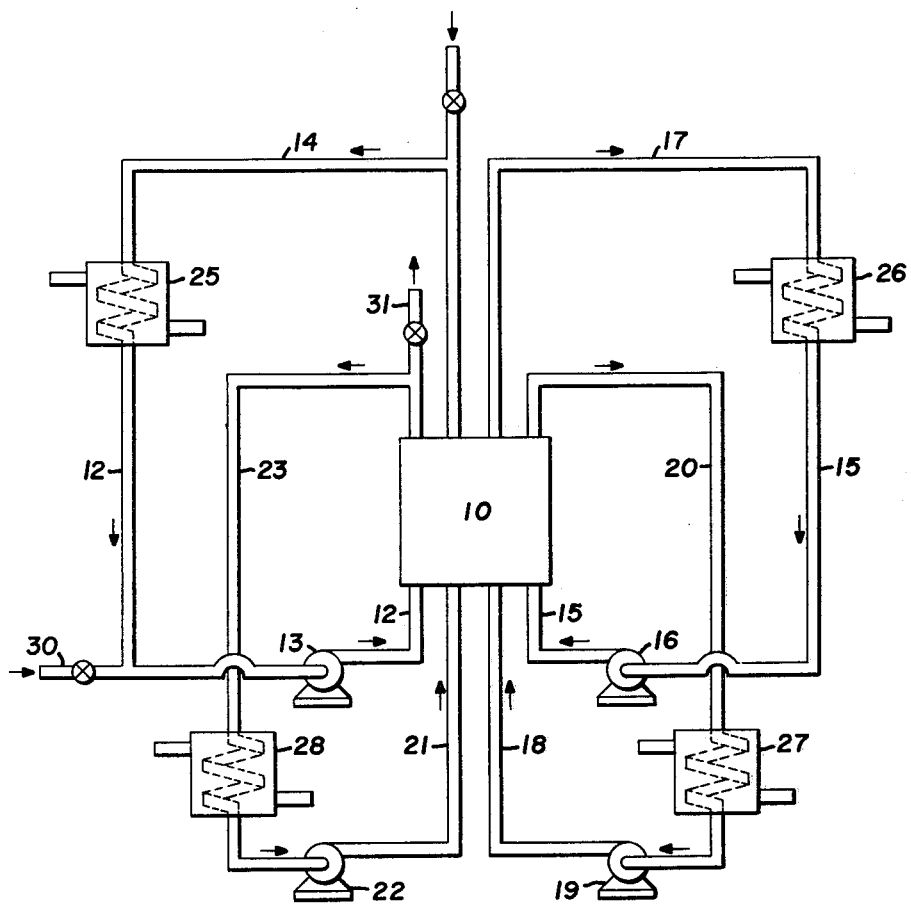
FIG. 1 is a diagrammatic illustration of a nuclear reactor of the present invention.

Referring now to FIG. 1, reference numeral 10 designates a reactor core (or reactor shell) wherein a nuclear reaction is effected by means of a liquid homogeneous nuclear fuel mixture containing fissionable material in critical mass concentrations. This homogeneous liquid fuel mixture is introduced essentially continuously to core 10 through a plurality of inlet lines 12, 15, 18 and 21 by means of pumps 13, 16, 19 and 22, respectively. These inlet lines preferably enter into the bottom portion of the reactor core 10. Simultaneously, liquid fuel is withdrawn from core 10 through outlet lines 14, 17, 20 and 23. Withdrawal is preferably from the top part of the reactor core 10. The flow of the homogeneous fuel mixture from bottom to top through the reactor core 10 has the advantage that any vapor formed in the reactor core can be more readily removed therefrom to thereby prevent the filling of the core with vapor. It will be understood that the lines for the present reactors need not be uniform in size.

Each pair of inlet and outlet lines is provided with a heat exchange means, generally a heat exchanger adapted to provide indirect heat exchange between the homogeneous liquid fuel mixture and a coolant. In FIG. 1, inlet line 12 and outlet line 14 are provided with heat exchanger 25; inlet line 15 and outlet line 17 are provided with heat exchanger 26; inlet line 18 and outlet line 20 are provided with heat exchanger 27; and inlet line 21 and outlet line 23 are provided with heat exchanger 28. It will be understood that more than one heat exchanger may be provided for each pair of inlet-outlet lines (or circuits). Thus, it will be seen that the nuclear reactor shown in FIG. 1 comprises a reactor core, a plurality of inlet lines for feeding a homogeneous nuclear fuel mixture to the reactor core, a plurality of outlet lines for withdrawing the liquid homogeneous nuclear fuel mixture from the reactor core and a plurality of heat exchangers for cooling the homogeneous liquid nuclear fuel mixture prior to recycle back to the reactor core. Thus, liquid fuel withdrawn from core 10 through outlet line 14 is cooled in heat exchanger 25 and recycled by pump 13 through inlet line 12 back to core 10. Similarly, liquid fuel withdrawn from core 10 through outlet line 17 is cooled in heat exchanger 26 and is then recycled back to core 10 through line 15 by means of pump 16; liquid fuel withdrawn from core 10 through line 20 is cooled in heat exchanger 27 and recycled back to core 10 through inlet line 18 by means of pump 19; and liquid fuel withdrawn from core 10 through outlet line 23 is cooled in heat exchanger 28 and recycled back to core 10 through inlet line 21 by means of pump 22. By means of the present invention, very high radiation fluxes and high power levels may be obtained since the homogeneous liquid fuel may be moved into and out of core 10 at extremely high rates. The nuclear reaction occurs essentially entirely in core 10 and does not occur to any appreciable extent in the inlet and outlet lines to core 10, nor in the heat exchangers.

The fissionable materials which may be employed in the present nuclear reactors include uranium 235, plutonium 239 and uranium 233 in the form of sulfates, nitrates, or other soluble salts. Specific examples of such salts include uranium 233 nitrate, plutonium 239 sulfate and uranium 235 nitrate. It will be understood, however, that the present invention is not limited to the use of any particular fissionable materials, or compounds, or method of homogeneous distribution; i.e., the fissionable materials may be in solution or suspension. Generally, it will be desirable that the homogeneous fuel fed to the reactor core be employed in conjunction with a moderator such as, for example, ordinary water, heavy water, or hydrocarbons. This gives a slow neutron operation. However, if desired, the solution or suspension of fuel may be in a non-moderating fluid such as a liquid metal (e.g., bismuth) to give a fast neutron reactor.

As specific examples of homogeneous liquid nuclear fuel compositions which may be employed in the present invention (including moderators), the following may be given: one-sixth molar solution of $UO_2SO_4$ in either light or heavy water with the uranium in the form of highly enriched U-235. Lower concentrations can be used with larger core vessel sizes and vice-versa. Equivalent concentrations of Pu-239 or U-233 salts could also be used. The concentration will be dictated by the critical mass for the fissionable material which in turn is determined by the fractional neutron loss from the core vessel, and the volume holdup of the core vessel. Fissionable metallic uranium or plutonium dissolved in bismuth at a temperature sufficiently high to keep the solution in the liquid phase can also be employed.

Generally, the temperature in core 10 will be dictated by the temperature-vapor pressure relationships of the moderator and its corrosion characteristics. Typical values would be 480° F. for a water moderated unit operating at 1,000 p.s.i.g. Generally, the maximum temperature in core 10 will be 300° to 700° F., depending on the pressure held on the system, if the fuel is suspended or dissolved in water. If the fuel is a soluble salt dissolved in water, temperatures as high as 800° F. or more can be used. If a liquid metal solvent is used, still higher temperatures are possible. Liquid bismuth, for example, will allow temperatures up to 1500° F. or higher to be used depending upon available materials of construction.

The maximum average residence time of the fuel in core 10 will be determined by the available temperature rise as set by allowable pressures, coolant temperatures, corrosion rates, power output, etc. However, to operate at the maximum flux, it will always be desirable to circulate the fuel through the critical mass zone at the maximum rate set by pressure drop in the circulating system. This will usually fall in the range of 0.1 to 0.01 second but may vary somewhat on either side, e.g., 0.001 to 1 second.

The radiation flux in core 10 may range as high as about $10^{15}$ to $10^{17}$ neutrons/cm.$^2$/sec. as limited by heat removal. Usually the radiation flux will be maintained at about $10^{12}$ to $10^{15}$ neutrons/cm.$^2$/sec. The critical mass necessary for effecting a controlled nuclear reaction in the present reactors will depend upon a number of factors, such as (1) the type of fissionable material employed as a nuclear fuel, (2) the nature and proportion of moderator present, (3) the concentration of the nuclear fuel in the total homogeneous solution, and (4) the design and configuration of the reactor core. For example, the critical mass in a 4 cubic foot sphere serving as the reactor core will be about one kilogram of uranium 235 in heavy water moderator. Specific power will depend upon the aforementioned factors plus the thermal flux. An approximate relationship between thermal flux and specific power (kilowatt capacity per ton of uranium 235) is shown below.

| Thermal neutron flux: | Specific power |
|---|---|
| $10^{12}$ | $5 \times 10^4$ |
| $10^{14}$ | $5 \times 10^6$ |
| $10^{15}$ | $5 \times 10^7$ |
| $10^{16}$ | $5 \times 10^8$ |

The amount of heat to be removed from the present nuclear reactors will depend upon the intensity of nuclear reaction maintained in reactor core 10. The cooling means in the present invention should generally have a capacity for heat removal of up to about $10^9$ (or more), usually about $10^3$ to $10^7$ B.t.u.'s per hour. It will be understood that the total heat load and the size of the reactor will depend on the intended use of the reactor; i.e., research reactors range from about 10 watts to 50,000 kilowatts and power reactors range from about 5,000 to 100,000 kilowatts. As an example of the heat to be removed the following is given: At a flux in the range of $10^{15}$ to $10^{16}$ neutrons/cm.$^2$/sec., the specific power load is $10^8$ kilowatts/ton of fuel; thus, if 2 lbs. of uranium 235 fuel is used in the critical mass reaction zone (not in the entire system) the heat load will be about $10^5$ kilowatts or about $3.4 \times 10^8$ B.t.u./hour. The coolants employed in heat exchangers 25 to 28 may be as follows: air, hydrogen, helium, light water, heavy water, sodium, sodium-potassium alloy, lead-bismuth alloy, lithium, fused salts such as LiCl—KCl eutectic mixture, mercury, Dowtherm, etc. Preferably the coolants employed in heat exchangers 25 to 28 are liquids. It will be understood that the heat removed from the circulating nuclear fuel in heat exchangers 25 to 28 may be employed, if desired, for producing power. Thus, cooling water may be employed as a coolant in heat exchangers 25 to 28, whereby high-pressure steam may be produced which may be employed to operate steam turbines and generators to produce power. Also, if desired, other coolants may be employed in heat exchangers 25 to 28, which in turn may be passed in heat exchange with water or other vaporizable material to thereby produce power sources.

It will be understood that fresh nuclear fuel may be introduced to the present reactors, and spent nuclear fuel may be withdrawn therefrom. This may be carried out continuously or intermittently, as desired. Thus, fresh nuclear fuel may be introduced to the nuclear reactor of FIG. 1 through line 30, and spent nuclear fuel may be withdrawn from the reactor by means of line 31. It will be understood that two or more such fuel supply lines may be employed and also that two or more spent fuel removal lines may be provided.

Figure 2:
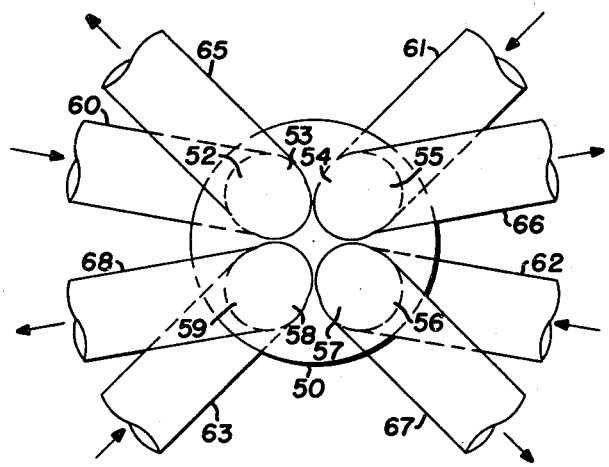
FIG. 2 is a schematic showing of a portion of a particular nuclear reactor design of the present invention.

One specific embodiment of the present invention is shown in FIG. 2. Referring now to FIG. 2, reference numeral 50 designates the core of a nuclear reactor of the present invention. Reactor core 50 comprises a hollow sphere provided with a plurality of ports 52 to 59. These ports 52 to 59 provide fluid communication between the interior of core 50 and inlet lines 60 to 63 and outlet lines 65 to 68. Ports 52, 54, 56 and 58 are inlet ports which coincide respectively in the showing in FIG. 2 with outlet ports 53, 55, 57 and 59. It will be understood that ports need not be uniform in shape nor size. Thus, in this particular embodiment of the invention, homogeneous liquid nuclear fuel mixture is continuously introduced to core 50 through inlet lines 60 to 63 (and ports 52, 54, 56 and 58), and the liquid fuel mixture is continuously withdrawn from core 50 through outlet lines 65 to 68 via ports 53, 55, 57 and 59. The fuel withdrawn from core 50 through outlet lines 65 to 68 is cooled (as in FIG. 1) and is then returned through the inlet lines 60 to 63 to the interior of core 50. In accordance with the present invention, there will be at least two inlet lines and at least two outlet lines for the liquid homogeneous fuel mixture being passed to and from core 50. However, generally in actual operation, it will be preferred to have at least four pairs of inlet and outlet lines to the reactor core 50. Generally, when it is desired to maximize flux, the ratio of the sum of the cross-sectional areas of the inlet ports (or the outlet ports) to the maximum (or largest) interior cross-sectional area of the interior of reactor core 50 will be at least about 1.0 and preferably will be at least about 1.25. If the sum of the cross-sectional area of both the inlet and outlet ports is considered, then this sum should be at least twice, and preferably at least 2.5 times, the maximum interior cross-sectional area of the reactor core. This arrangement minimizes pressure drop through the ports. Inlet and outlet pressure drops through such ports are a significant fraction of the total system pressure drop unless the ports are large enough. (Thus, for example, if the reactor core is a sphere having a radius of 1 foot, the maximum interior cross-sectional area of the core would be about 3.14 sq. ft. This sphere would then be provided, for example, in accordance with the present invention with 4 inlet ports and 4 outlet ports, each of the inlet and outlet ports having a cross-sectional area of at least about 0.8 sq. ft.) It should be noted that in this embodiment of the invention, the superficial velocity of the fuel mixture external to the core is preferably less than the minimum superficial velocity within the core. The plurality of large inlet and outlet lines to the reactor core is accountable for the unique features of the present invention and makes possible the high radiation fluxes and power levels for the presently-designed reactors. Thus, the fuel mixture may be moved through the reactor core at extremely rapid rates due to the relatively low pressure drop in the inlet and outlet lines. It will be understood that the shape of the reactor core need not necessarily be spherical, and can also be cylindrical or rectangular if desired. Generally, the ports and conduits (cross-section) will have a circular shape, but this is not essential. It should be noted that if desired the fuel mixture may be cooled in the present reactors without inducing essentially any radioactivity into the coolant by providing sufficient residence time in the conduits leading from the reactor core to the heat exchangers to allow for release of the delayed neutrons.

Figure 3:
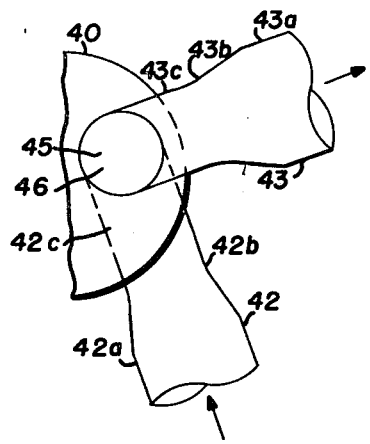
FIG. 3 is a schematic showing of a modification of the nuclear reactor design of FIG. 2.

In a particularly preferred embodiment of the present invention, the inlet and outlet lines to the reactor core are enlarged in cross-sectional area (as compared to the cross-sectional area of their respective ports) in those portions removed from the critical mass zone in the reactor core. This arrangement is shown in FIG. 3. Referring now to FIG. 3, reference numeral 40 designates a reactor core (shown in partial section) similar to that shown in FIG. 2. Reactor core 40, similar to the reactor core of FIG. 2, is provided with a plurality of inlet lines and a plurality of outlet lines as well as cooling means for each pair of inlet-outlet lines. For example, reference numeral 42 designates an inlet line which communicates with the interior of core 40 by means of port 45, and reference numeral 43 designates an outlet line which communicates with the interior of core 40 by means of port 46. (The two ports as shown in FIG. 3 coincide in the drawing.) More particularly, inlet line 42 has an enlarged section 42a, a necked-down section 42b and a reduced section 42c. Similarly, outlet line 43 has an enlarged section 43a, a necked-down section 43b and a reduced section 43c. Preferably the necked-down sections have a gradual taper to minimize pressure drop. Generally, the extensions of inlet line 42 and outlet line 43 to the cooling apparatus (not shown) will have the same diameter as enlarged sections 42a and 43a. This particular arrangement has the advantage that the rate of flow of the homogeneous fuel mixture through these enlarged sections and through the cooling apparatus can be maintained at a relatively low level (which permits greater heat exchange at a given pressure drop). Also, the enlarged sections substantially reduce the pressure drop in the inlet and outlet lines. It will be understood, of course, that the volume of homogeneous fuel mixture in these enlarged sections is insufficient to maintain a continuous chain nuclear reaction per se. Generally, the embodiment of the invention shown in FIG. 3 is particularly applicable to those reactors which have more than two pairs of inlet-outlet lines, because in these cases the enlarged sections may generally have a cross-sectional area at least about two times the cross-sectional area of the ports.

Thus, in FIG. 3, homogeneous fuel mixture is passed through line 42 into core 40 and is removed from core 40 through line 43. As the homogeneous fuel mixture passes from section 42a through section 42b into section 42c, the flow rate is increased. Then as the homogeneous fuel mixture flows from reactor 40 through section 43c and section 43b into section 43a, the flow rate is reduced. Preferably each line (or conduit) is enlarged at a point in close proximity to the reactor core, the only limitation as to the minimum allowable spacing between the core and the enlarged section being that concerned with critical mass relationships; i.e., the spacing should be sufficient to contain the critical mass zone within the reactor core and not also in the conduits. The particular arrangement shown in FIG. 3, that is, the provision of conduits of larger diameter (as compared to the diameter of the ports) external to the reactor core, may be employed in like manner in any of the other specific embodiments of the present invention shown and described hereinafter. It should be noted that the advantages of reduced pressure drop and increased cooling capacity may also be obtained by providing a plurality of separate lines having a capacity equal to the enlarged line section.

Figure 4:
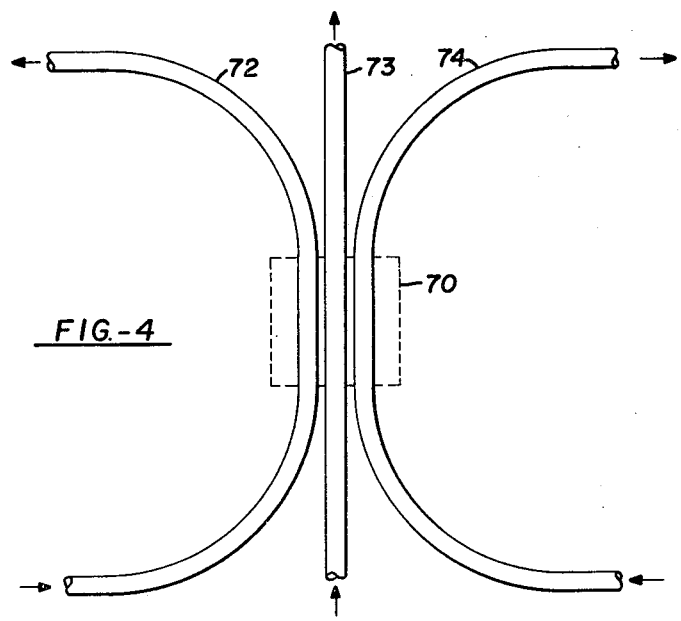
FIG. 4 is a schematic showing of a portion of a second embodiment of the nuclear reactor of the present invention.

A second embodiment of the present type of nuclear reactor is shown in FIG. 4. Referring now to FIG. 4, reference numeral 70 designates a zone of critical mass (shown by dotted lines) serving as the core of a nuclear reactor of the present invention. This particular nuclear reactor design comprises a plurality of pipes such as pipes 72, 73 and 74 which converge in the area of critical mass zone 70 and diverge outside of this zone. Liquid homogeneous nuclear fuel mixture is fed essentially continuously in individual streams through pipes 72, 73 and 74, the liquid fuel mixture participating in the nuclear reaction in critical mass zone 70 and thereafter passing from this zone to heat exchangers located remote to the critical mass zone (such as shown in FIG. 1). This particular embodiment of the present invention shown in FIG. 4 has a number of advantages. One of these advantages is that this design eliminates localized "hot spots" of nuclear reaction since the fuel is passed continuously and uniformly through the individual pipes. This arrangement thus provides a relatively uniform consumption of the nuclear fuel in the nuclear reactor. An additional advantage of FIG. 4 is that it is readily adaptable to the use of solid moderators, absorbers, etc. for controlling the nuclear reaction. Such solid control elements may be readily passed into and withdrawn from the critical mass zone 70 by moving them into and out of or around the critical mass zone between the individual pipes. Also if desired liquid moderators such as ordinary or heavy water or hydrocarbons may be circulated within separate pipe circuits through the reactor core, each of the pipe circuits being provided with cooling means.

Figure 5:
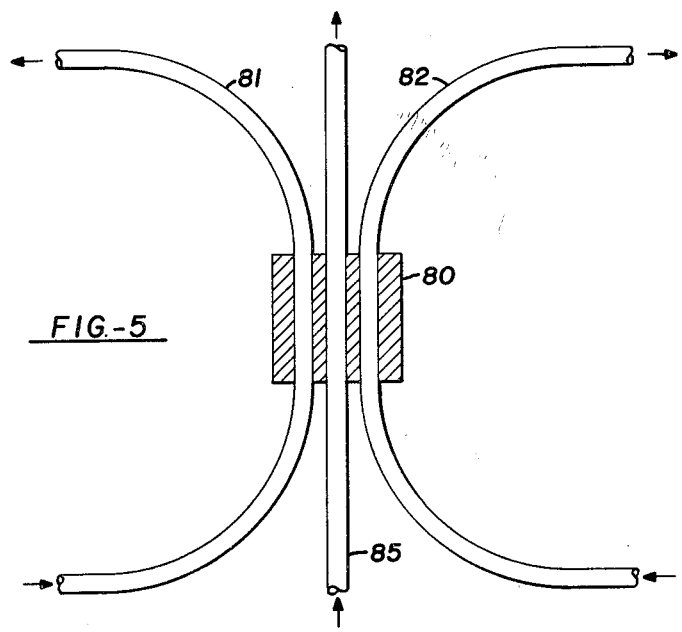
FIG. 5 is a schematic showing of a portion of a third nuclear reactor design of the present invention.

Another embodiment of the present nuclear reactor is shown in FIG. 5. Referring now to FIG. 5, reference numeral 80 designates a fixed source of solid fissionable materials (or liquid homogeneous fuel mixture). Passing through source 80 are a plurality of pipes or conduits, such as pipes 81 and 82, which are adapted to pass individual streams of liquid homogeneous nuclear fuel mixture essentially continuously through the interior of source 80. More particularly, the liquid fuel is passed continuously by means of lines 81 and 82, through source 80 and then to heat exchangers located remote to the reactor core, where the liquid fuel is cooled (such as shown in FIG. 1), and the cooled liquid fuel is then recycled back through pipes 81 and 82, through source 80 which is located in the zone of critical mass. A coolant such as ordinary water, heavy water or a hydrocarbon may be passed through source 80 by means of conduit 85 to thereby remove heat from fixed source 80. This coolant which may also serve as a moderator will generally be recycled after it has been cooled external to the critical mass zone. A plurality of such coolant conduits may be provided. (In the case where source 80 comprises a liquid homogeneous fuel mixture, inlet and outlet conduits may be provided to circulate this mixture to heat exchangers.)

One of the advantages of the embodiment of the invention shown in FIG. 5 resides in the reduced inventory of fissionable materials required for the operation of this particular embodiment of the nuclear reactor. Thus, a substantial proportion of the fissionable material participating in the nuclear reaction is fixed in the critical mass zone (the solid source) and only a portion of the fissionable material is withdrawn from the critical mass zone (the liquid fuel) for cooling.

Conventional shielding techniques may be employed in conjunction with the operation of the present nuclear reactors. More particularly, dense concrete made by addition of iron punchings or heavy ores to regular concrete may be used, or bulk shielding similar to that in a water shielded swimming pool may be used. Materials such as beryllium, graphite or heavy water may be used as neutron reflectors around the reactor core. The materials of construction employed in the present invention may also be of conventional nature familiar to those skilled in the art. For example, the reactor core walls and inlet and outlet lines may be constructed of stainless steel. In the operation of the present nuclear reactors, the usual precautions for safety will be employed. These include control rods, coarse or fine cadmium or beryllium steel safety rods and independent instruments to control rate of power rise.

Figure 6:
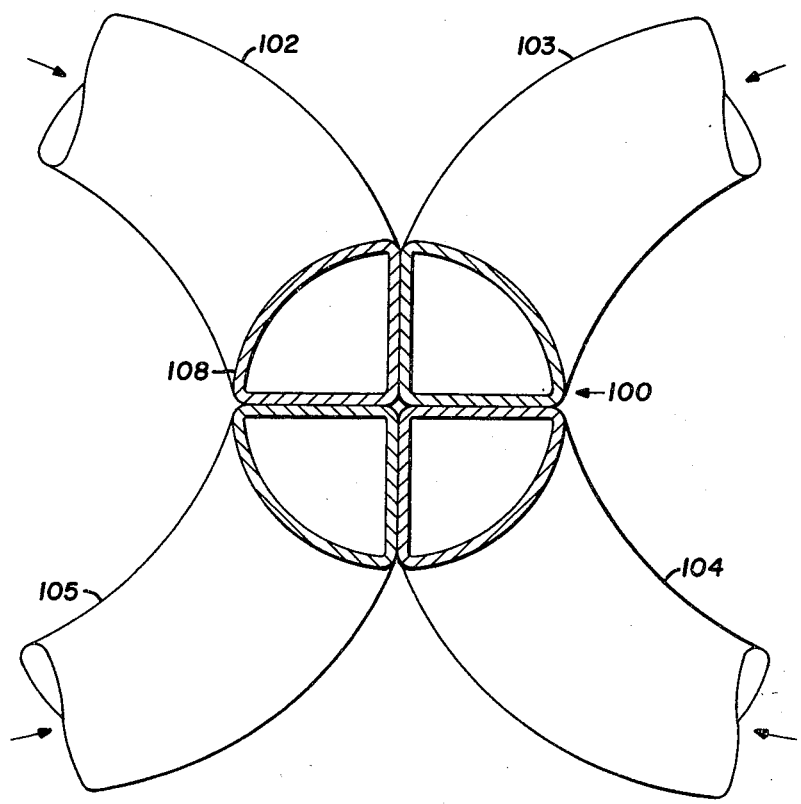
FIG. 6 is a schematic showing of a portion of a specific embodiment of the present nuclear reactor.

A specific embodiment of the present invention will now be described in connection with FIG. 6, which shows in cross-section a portion of a specific nuclear reactor of the present invention. In this example, the nuclear reactor 100 comprises four conduits, 102, 103, 104 and 105, which converge to form core 108 and thereafter diverge. The cross-section shown in FIG. 6 is taken in the core area. Each of conduits 102 to 105 external to core 108 is circular in cross-section having a diameter of approximately 6". These conduits, which are constructed of carbon steel, are shaped in the area of core 108 in the form of quarter sections of a circle as shown in FIG. 6. The effective core volume is approximately 0.28 cubic foot.

The nuclear reactor 100 operates at a power level of about 28,000 kw. and has a thermal neutron flux of about $1 \times 10^{15}$ and a fast neutron flux of about $2 \times 10^{15}$ neutrons/cm.$^2$/sec. The homogeneous nuclear fuel mixture comprises a solution of $UO_2SO_4$ and ordinary water wherein the uranium is enriched uranium containing approximately 93% of U-235. The concentration of U-235 in the water is approximately 40 grams of U-235 per liter of solution. The homogeneous fuel solution enters core 108 at an inlet temperature of about 300° F. and exits therefrom at an outlet temperature of about 400° F. The system is maintained under a pressure of about 1000 p.s.i.g. and homogeneous fuel solution is continuously passed through conduits 102, 103, 104 and 105 at the rate of approximately 6 feet per second (superficial velocity). Each of conduits 102 to 105 is provided external to the core with conventional heat exchange means (not shown) such that approximately $2.5 \times 10^7$ B.t.u.'s per hour are removed from each of the four circulating streams of homogeneous fuel mixture. If desired, a conventional recombiner for gaseous decomposition products from the moderator may be provided in the present reactor. Also the reactor core 108 may be surrounded by a beryllium reflector and additionally if desired by graphite. Generally the entire reactor system will be shielded by conventional shielding such as steel plus dense concrete.

What is claimed is:

1. A heat producing nuclear chain reaction process comprising maintaining a critical mass of fluid nuclear fuel in a nuclear reaction zone, continually withdrawing a plurality of heated individual streams of said nuclear fuel directly from said nuclear reaction zone, removing heat from the fluid nuclear fuel so withdrawn and returning fluid nuclear fuel so cooled as a plurality of individual streams directly to said nuclear reaction zone and maintaining the rate of flow of said fluid nuclear fuel in said individual streams at a rate less than the minimum average rate of flow thereof in said nuclear reaction zone.

2. The process of claim 1 wherein the neutron flux in said reaction zone is maintained above $3 \times 10^{13}$ neutrons/cm.$^2$/sec. and the temperature therein is maintained in the range of 300 to 700° F. by the said removing of heat.

3. The process of claim 1 wherein at least four individual streams of said fluid nuclear fuel are fed to and withdrawn from said nuclear reaction zone and wherein the average residence time of said fluid nuclear fuel in said nuclear reaction zone is in the range of 0.001 to 1 second.

4. A homogeneous nuclear reactor comprising a reactor core adapted to contain a fluid nuclear fuel in a nuclear chain reaction supporting arrangement, a plurality of individual inlet conduits adapted to admit said fluid nuclear fuel directly to said reactor core and a plurality of individual outlet conduits adapted to remove said fluid nuclear fuel directly from said reactor core, the ratio of the sum of the cross-sectional areas of said inlet conduits at a point contiguous to said reactor core to the largest interior cross-sectional area of said reactor core being greater than one and the ratio of the sum of the cross-sectional areas of said outlet conduits at a point contiguous to said reactor core to the largest interior cross-sectional area of said reactor core being greater than one, said conduits also being adapted to contain said fluid nuclear fuel in less than critical mass concentrations.

5. The reactor of claim 4 wherein both of said ratios are greater than 1.25.

6. The reactor of claim 4 wherein said fluid nuclear fuel is a liquid uranium-water solution and the neutron flux in said reactor core is greater than $3 \times 10^{13}$ neutrons/cm.$^2$/sec.

7. The reactor of claim 4 comprising in addition thereto heat exchange means adapted to remove heat from said fluid nuclear fuel externally of said reactor core and means for circulating said fluid nuclear fuel from said outlet conduits through said heat exchange means to said inlet conduits.

8. The reactor of claim 7 when there are at least four sets of paired inlet and outlet conduits with associated individual heat exchange means and said fluid nuclear fuel flows independently through each set of conduits and heat exchange means.

9. The reactor of claim 7 wherein said heat exchange means and means for circulating said fluid nuclear fuel are adapted to maintain a relatively constant temperature in said reactor core in the range of 300–700° F.

10. The reactor of claim 7 wherein each of said sets of paired inlet and outlet conduits converge to form said reactor core with the flow of said fluid nuclear fuel therethrough being in independent channels.

References Cited in the file of this patent

UNITED STATES PATENTS

| | | |
|---|---|---|
| 2,708,656 | Fermi et al. | May 17, 1955 |
| 2,743,225 | Ohlinger et al. | Apr. 24, 1956 |

FOREIGN PATENTS

| | | |
|---|---|---|
| 751,700 | Great Britain | July 4, 1956 |

OTHER REFERENCES

United States Atomic Energy Commission CF–53–8–225, August 1953.

"Proceedings of the International Conference on the Peaceful Uses of Atomic Energy," vol. 3, pp. 211–242, United Nations, N.Y., August 1955.

"The Science and Engineering of Nuclear Power," Clark Goodman, 1947, pp. 297, 304, 307, 308.

"Chemical and Engineering News," vol. 33, p. 2156, May 16, 1955.

Visner, Sidney: CF–F4–6–180, June 23, 1954.